United States Patent
Hughes, II et al.

(10) Patent No.: US 11,186,453 B2
(45) Date of Patent: Nov. 30, 2021

(54) SANDBAG FILLING SYSTEM AND A METHOD THEREOF

(71) Applicant: Truck and Transportation Equipment Co., Inc., Jefferson, LA (US)

(72) Inventors: H. Daniel Hughes, II, Jefferson, LA (US); George Wilson, Jefferson, LA (US); Richard Toal, Jefferson, LA (US); Alex Fabio, Jefferson, LA (US)

(73) Assignee: Truck and Transportation Equipment Co., Inc., Jefferson, LA (US)

( * ) Notice: Subject to any disclaimer, the term of this patent is extended or adjusted under 35 U.S.C. 154(b) by 45 days.

(21) Appl. No.: 16/713,668

(22) Filed: Dec. 13, 2019

(65) Prior Publication Data

US 2021/0179370 A1 Jun. 17, 2021

(51) Int. Cl.
*B65G 65/42* (2006.01)
*B65B 1/30* (2006.01)
*B65B 1/06* (2006.01)

(52) U.S. Cl.
CPC ............. *B65G 65/42* (2013.01); *B65B 1/06* (2013.01); *B65B 1/30* (2013.01)

(58) Field of Classification Search
CPC .. B65G 65/42; B65B 1/06; B65B 1/30; B65D 90/582; B65D 90/58; B65D 90/585; B65D 90/587; B65D 90/60
USPC ............. 141/10, 231, 311 R, 313, 317, 362; 222/415, 627; 298/7; 414/507, 518, 519
See application file for complete search history.

(56) References Cited

U.S. PATENT DOCUMENTS

| | | | | |
|---|---|---|---|---|
| 4,044,921 A * | 8/1977 | Caverly | ................ | B65D 88/68 222/74 |
| 4,301,741 A * | 11/1981 | Chierici | ............... | B65D 90/587 105/282.3 |
| 5,121,775 A * | 6/1992 | McClain | .................. | B65B 1/32 141/114 |
| 5,829,949 A * | 11/1998 | Brown | .................. | E04G 21/025 414/725 |
| 5,873,396 A * | 2/1999 | Biebrach | ................... | E02F 5/22 141/231 |
| 5,947,347 A * | 9/1999 | Cline, Sr. | .................. | B60P 1/42 222/627 |
| 6,119,740 A * | 9/2000 | Wilham, Jr. | ............. | B65B 1/06 141/313 |
| 6,776,198 B1 * | 8/2004 | Haines | ...................... | B65B 1/12 141/10 |
| 2001/0042763 A1 * | 11/2001 | Malone | ................. | G01F 11/003 222/415 |
| 2007/0215238 A1 * | 9/2007 | Ruikka | .................. | B28C 7/044 141/83 |

* cited by examiner

*Primary Examiner* — Timothy P. Kelly
*Assistant Examiner* — Christopher M Afful
(74) *Attorney, Agent, or Firm* — BakerHostetler

(57) ABSTRACT

A sandbag filling system includes a support frame, a driving unit, a conveyor unit, and a hopper chute. The support frame includes a feed gate and an adjustable mount and is configured to receive a material and guide the material to a conveyor belt. The driving unit is arranged in the support frame and includes a motor connected to a drive shaft. The conveyor unit is arranged in the support frame as well and includes a conveyor belt configured to be moved by the driving unit. The hopper chute is arranged below the feed gate of the support frame and located proximal to the conveyor belt.

18 Claims, 15 Drawing Sheets

SANDBAG FILLING SYSTEM AND A METHOD THEREOF

FIELD OF THE DISCLOSURE

The disclosure generally relates to a material handling system. More particularly, the disclosure relates to a material handling system that may be attached to a truck, a dump truck, a vehicle, a pickup truck, a tractor-trailer, a large tractor, a trailer, a rail car, and/or the like. The disclosure also generally relates to a system for filling sandbags. More particularly, the disclosure relates to a system for filing sandbags using a material handling system that may be attached to a truck, a dump truck, a vehicle, a pickup truck, a tractor-trailer, a large tractor, a trailer, a rail car, and/or the like. The disclosure also generally relates to a method of filling sandbags. More particularly, the disclosure relates to a method of filing sandbags using a material handling system that may be attached to a truck, a dump truck, a vehicle, a pickup truck, a tractor-trailer, a large tractor, a trailer, a rail car, and/or the like. The disclosure further generally relates to a dual conveyor material handling system. More particularly, the disclosure relates to a dual conveyor material handling system that may be attached to a truck, a dump truck, a vehicle, a pickup truck, a tractor-trailer, a large tractor, a trailer, a rail car, and/or the like. The disclosure also generally relates to a dual conveyor system for filling sandbags. More particularly, the disclosure relates to a dual conveyor system for filing sandbags using a material handling system that may be attached to a truck, a dump truck, a vehicle, a pickup truck, a tractor-trailer, a large tractor, a trailer, a rail car, and/or the like. The disclosure also generally relates to a method of filling sandbags with a dual conveyor. More particularly, the disclosure relates to a method of filing sandbags using a dual conveyor material handling system that may be attached to a truck, a dump truck, a vehicle, a pickup truck, a tractor-trailer, a large tractor, a trailer, a rail car, and/or the like.

BACKGROUND OF THE DISCLOSURE

In emergency situations where possible flooding is contemplated, there is a need for sandbags to protect property from damage by flooding. In this regard, protection from flooding typically requires many sandbags to block water from intruding into or onto a dwelling, a building, property, or the like. In particular, sandbags may be utilized to mitigate the effects of an anticipated flood event. Alternatively or additionally, sandbags may also be required for revetment, bank stabilization, temporary bridge construction, military uses for walls and protection, retaining walls, supporting or protecting a rampart, a wall, a barricade, a barricade to provide protection from blast, a barricade to prevent planes from overrunning when landing, and/or the like.

Typically, a truck is used to transport material to a location where sandbags are needed. Thereafter, sandbags are filled manually by holding a sandbag and filling the sandbag by hand, for example filling the sandbag by shoveling the sand into the sandbag. However, this manual filling of sandbags is slow and inefficient. Moreover, the slow filling of sandbags during emergencies presents an obvious detriment to protecting a dwelling, a building, property, or the like.

Therefore, it is desirable to have a system to quickly and efficiently fill sandbags. Additionally, it is desirable to have a system to quickly and efficiently fill sandbags in order to protect property from flood damage and the like. Moreover, it is desirable to have a system to quickly and efficiently fill sandbags in association with a truck, a dump truck, a vehicle, a pickup truck, a tractor-trailer, a large tractor, a trailer, a rail car, and/or the like providing sand. Additionally, it is desirable to have a system to quickly and efficiently fill sandbags in association with a truck, a dump truck, a vehicle, a pickup truck, a tractor-trailer, a large tractor, a trailer, a rail car, and/or the like providing sand, in order to protect property from flood damage and the like.

SUMMARY OF THE DISCLOSURE

The foregoing needs are met, to a great extent, by the disclosure, wherein in one aspect a sandbag filling system is provided, in another aspect a method of filling a sandbag is provided, in another aspect a dual conveyor sandbag filling system is provided, and in another aspect a method of filling a sandbag is provided utilizing a dual conveyor.

In one aspect, the disclosure pertains to a sandbag filling system. The sandbag filling system includes a support frame, driving units, conveyor units, and tapered hopper chutes. The support frame includes feed gates and an adjustable mount and is configured to receive a material and guide the material to two conveyor belts. The driving units are arranged in the support frame and include motors connected to drive shafts. The conveyor units are arranged in the support frame as well and include two conveyor belts configured to be moved by the driving units. The tapered hopper chutes are arranged below the feed gates of the support frame and located proximal to the conveyor belts.

An aspect of the disclosure pertains to a sandbag filling system. This sandbag filling system includes a support frame, a driving unit, a conveyor unit, and a tapered hopper chute. The support frame includes a feed gate and an adjustable mount and is configured to receive a material and guide the material to a conveyor belt. The driving unit is arranged in the support frame and includes a motor connected to a drive shaft. The conveyor unit is arranged in the support frame as well and includes a conveyor belt configured to be moved by the driving unit. The tapered hopper chute is arranged below the feed gate of the support frame and located proximal to the conveyor belt.

Another aspect of the disclosure includes a drive shaft sprocket attached to the drive shaft. In this aspect, a conveyor unit also includes a conveyor unit shaft, a cross-bar support between the drive shaft and the conveyor unit shaft, a conveyor unit shaft sprocket, and a chain mounted to the conveyor belt. The chain is configured to connect to the drive shaft sprocket and the conveyor unit shaft sprocket.

Still another aspect of the disclosure includes a dual conveyor unit system. In addition to the first aspect of the disclosure, a second driving unit, a second conveyor unit, and a second tapered hopper chute is included. Both driving units may be operated separately to control each conveyor unit.

Yet another aspect of the disclosure includes a hydraulic motor within the driving unit. A hydraulic reservoir is also included with a fluid connection to the hydraulic motor, and an electric actuator is provided to control the hydraulic motor. An electric switch may be also provided to control the electric actuator. In one aspect, the hydraulic motor may include two or more hydraulic motors.

Yet still another aspect of the disclosure is related to a method of filling sandbags. The method includes providing a support frame, providing two driving units, providing two conveyor units, providing two tapered hopper chutes, receiving a material in the support frame, delivering the material to two feed gates with two conveyor belts in response to two electric switches that each control one of the two conveyor belts, and feeding the material to the two tapered hopper chutes through one of the two feed gates.

Yet still another aspect of the disclosure is related to a method of filling a sandbag. The method includes providing a support frame, providing a driving unit, providing a conveyor unit, providing a tapered hopper chute, receiving a material in the support frame, delivering the material to a feed gate with a conveyor belt in response to an electric switch that controls the conveyor belt, and feeding the material to the tapered hopper chute through a feed gate.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

The foregoing and other objectives, features, and advantages of the disclosure will become more apparent from the following detailed description taken in conjunction with the accompanying drawings.

Hereinafter, an apparatus and a method for a sandbag filling system according to the disclosure will be described in detail with reference to the accompanying drawings. The described aspects are provided so that those skilled in the art can easily understand the technical spirit of the disclosure, and thus the disclosure is not limited thereto. In addition, the accompanying drawings are schematic drawings for easily understand and the aspects of the disclosure and thus the matters represented in the accompanying drawings may be different from those actually implemented.

As described herein, the apparatus and method for a sandbag filling system according to the disclosure may be used while attached to a means of storage & conveyance such as a dump truck. In this regard, the apparatus and method for a sandbag filling system according to the disclosure is differentiated from simply utilizing backhoes, tractors, bucket loaders, etc. to either fill or move material to create sandbags at one location, which subsequently requires the sandbags to be transported to a desired location. The apparatus and method for a sandbag filling system according to the disclosure gives operators an ability to create sandbags where needed as opposed to simply creating them and then needing to transport the filled bags to the desired location.

Meanwhile, each component shown below is only an example for implementing the disclosure. Therefore, other components may be used in other implementations of the disclosure without departing from the spirit and scope of the disclosure.

Additionally, it should be understood that the expression "including" certain elements is an "open type" expression indicating certain components and does not exclude additional components.

Figure 1:
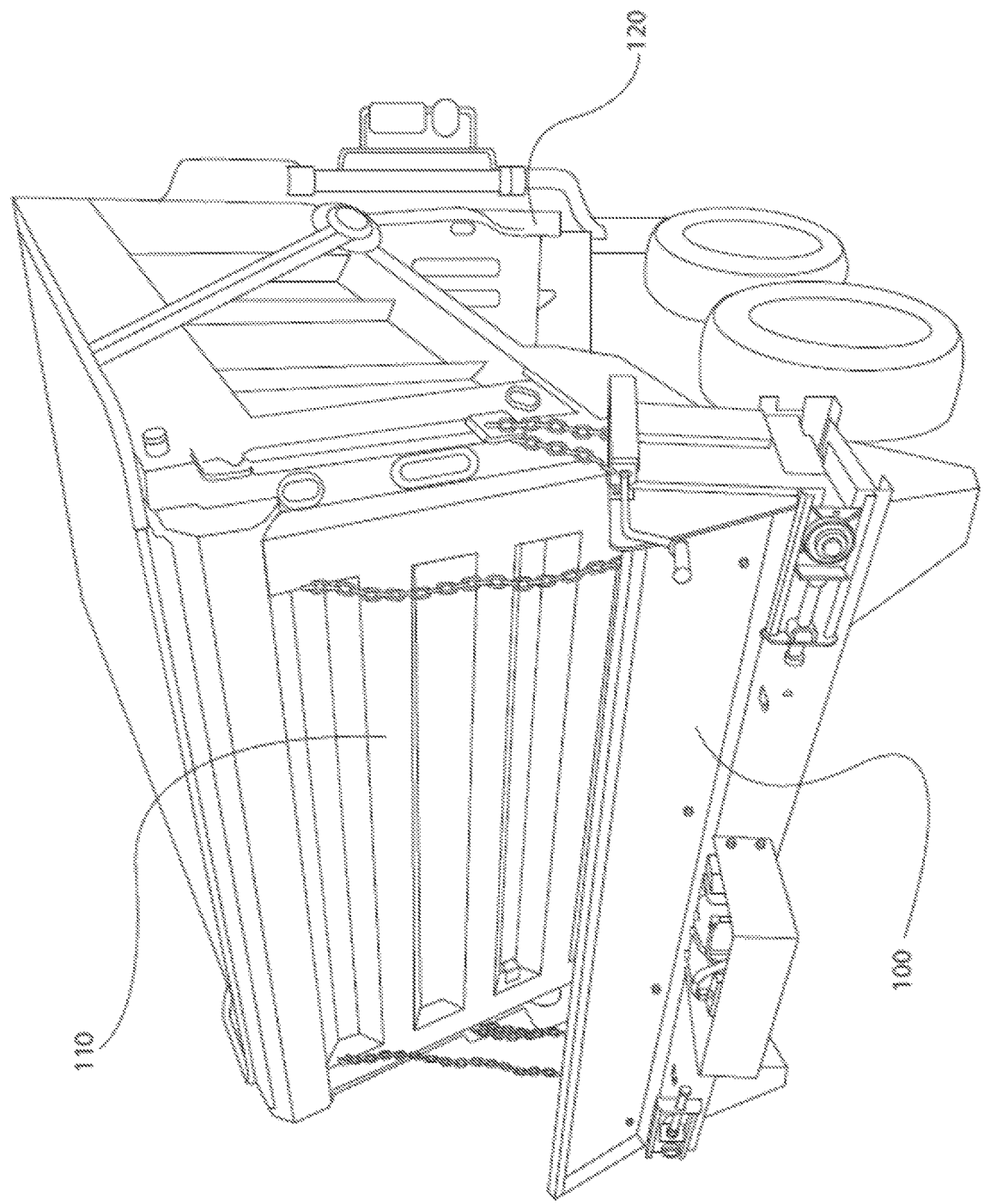
FIG. 1 is a perspective view of a sandbag filling system attached to a truck according to an aspect of the disclosure.

FIG. 1 is a perspective view of a sandbag filling system attached to a truck according to an aspect of the disclosure.

In FIG. 1, a sandbag filling system 100 is illustrated. The sandbag filling system 100 may be attached to a truck 120 or another type of vehicle. Other types of vehicles may include a dump truck, a pickup truck, a tractor-trailer, a large tractor, a trailer, a rail car, and/or the like. In this regard, the terminology truck is utilized for brevity of disclosure and the sandbag filling system 100 may be utilized with any type of vehicle. In other aspects, the sandbag filling system 100 may be implemented as a standalone configuration. The truck may carry sand in a dump box 110, and when the truck reaches a location where sandbags are needed, the truck 120 may be operated to raise the dump box 110 to pour sand or other material into the sandbag filling system 100.

Figure 2:
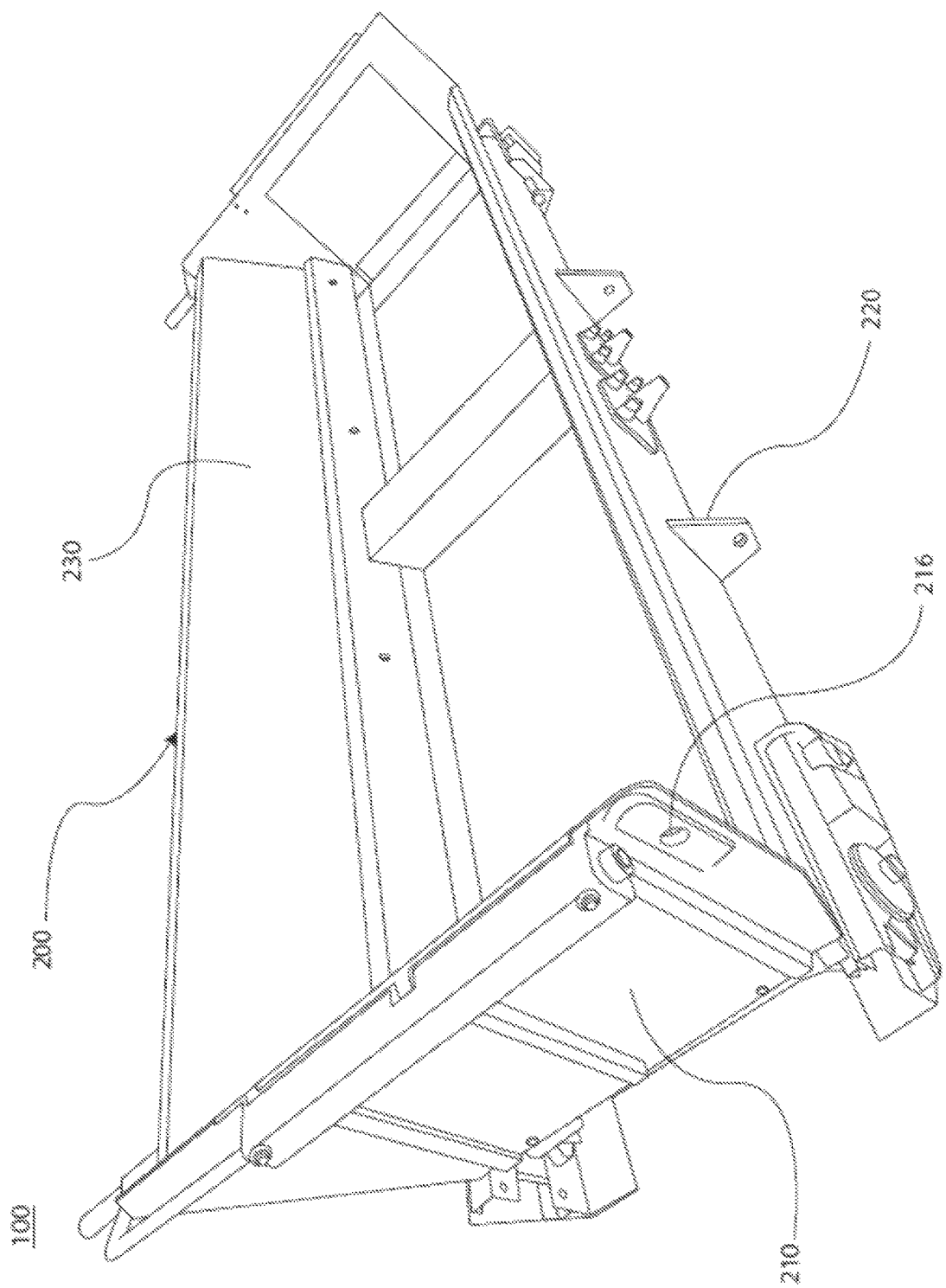
FIG. 2 is a perspective view of a support frame of a sandbag filling system according to an aspect of the disclosure.

FIG. 2 is a perspective view of a support frame of a sandbag filling system according to an aspect of the disclosure.

When sand is poured into the sandbag filling system 100, it may be beneficial not to waste sand by pouring outside of the sandbag filling system 100. For this purpose, a support frame 200 is provided as shown in FIG. 2. The support frame 200 may be made from metal, and all major joints may be continuously welded except where flexural movement is required. At these areas, skip welding may be employed. In one aspect, the components may be steel and may be painted to reduce corrosion. In other aspects, the support frame 200 may be constructed from aluminum, magnesium, copper, plastics, carbon fibers, composite wood such as plywood, reinforced plastics, such as fiber-reinforced polymer or fiberglass, metal matrix composites, other advanced composite materials including fiber-reinforced polymers (FRP)s, carbon-fiber-reinforced polymer (CFRP) materials, glass-reinforced plastic (GRP) materials, and the like.

In other aspects, the support frame 200 may include mechanical fasteners for fastening various components together.

Figure 3:
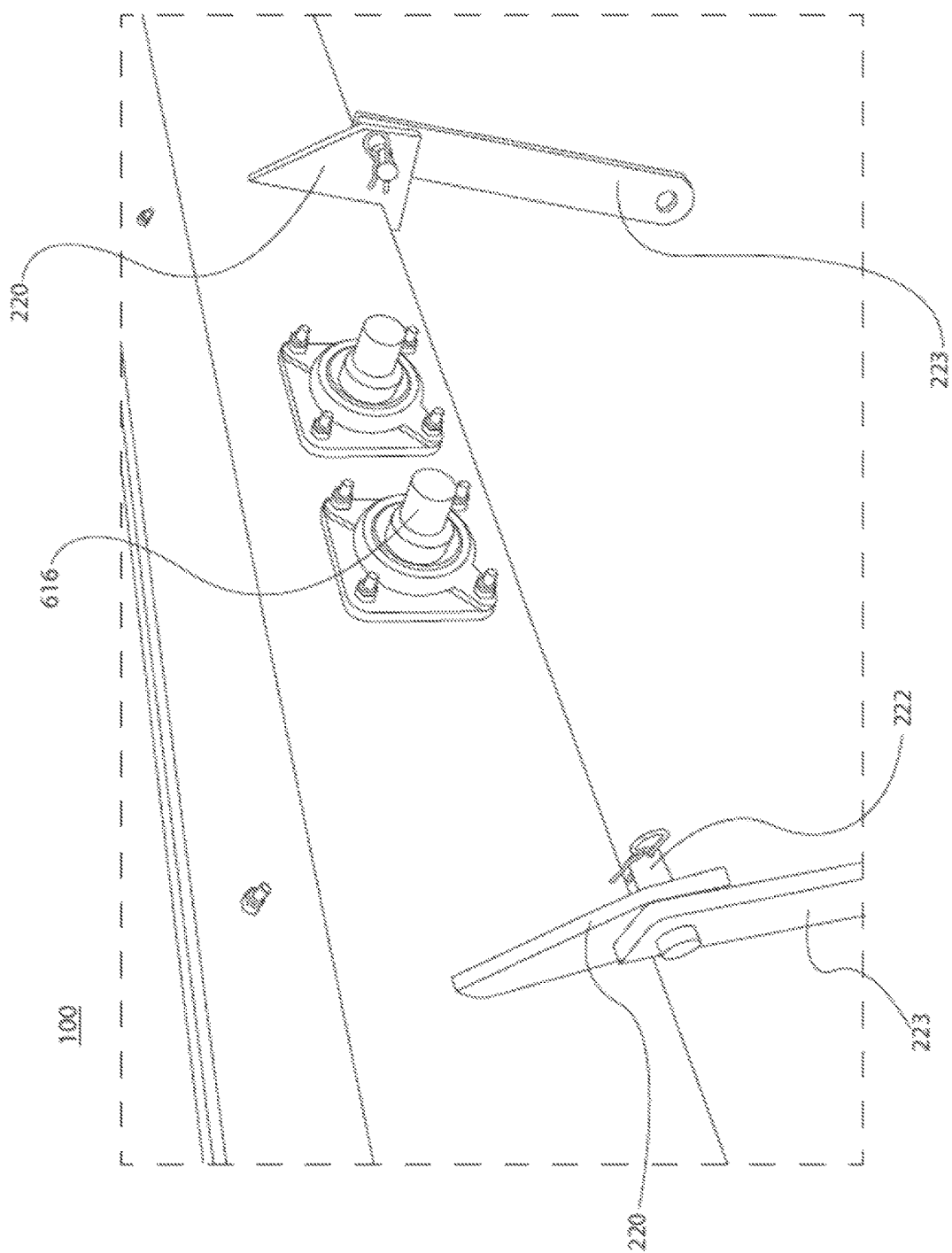
FIG. 3 is a sectional view of an adjustable mount of a support frame according to an aspect of the disclosure.

The support frame 200 may be attached to the truck 120 by an adjustable mount 220. In an exemplary aspect, the adjustable mount 220 can be configured to receive a fastener that engages and fastens the adjustable mount 220 to the truck 120. In another exemplary aspect, the adjustable mount 220 may be configured to receive a pin 222 that may be connected to the truck 120. In still another exemplary aspect, the adjustable mount 220 may be configured to be a spring-loaded key clip system. Generally, the adjustable mount 220 may also be configured to be a quick connect and quick disconnect. Additionally, a mount bar 223 as illustrated in FIG. 3, may be used to fix the support frame 200 to the truck 120 via pins 222. Although exemplary aspects in this disclosure use a fastener, a pin, and/or a clip, it is noted that various configurations can be made within the scope of the disclosure such that other types of fastening components are contemplated as well.

Figure 4:
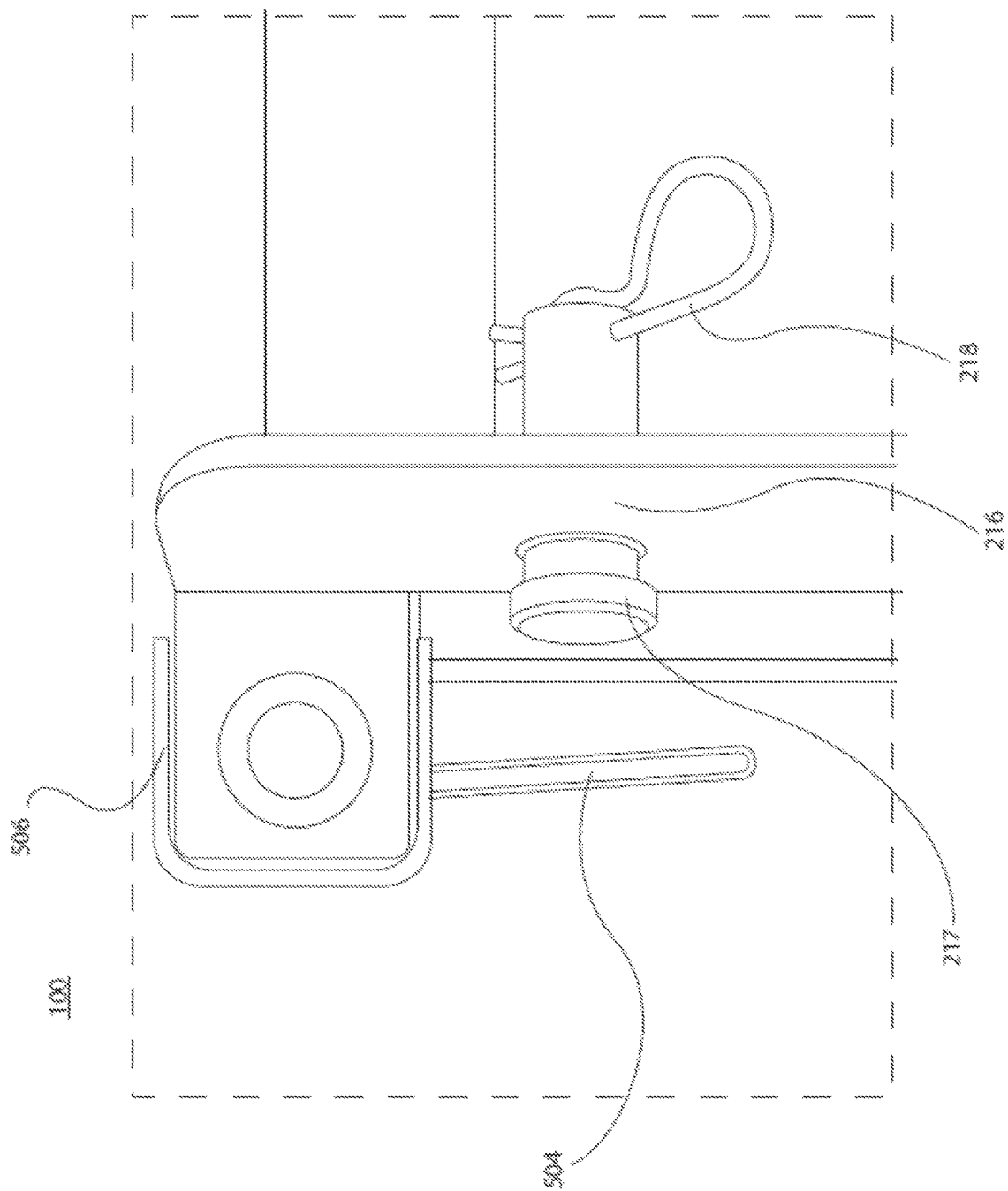
FIG. 4 is a sectional view of a mounting plate of a support frame according to an aspect of the disclosure.

In addition to the adjustable mount 220, a dump box mount 216 may be used. For example, the dump box mount 216 may be configured with a pin hole and may be provided in the support frame 200. In one aspect, the dump box mount 216 may be located higher than the adjustable mount 220. A dump box mount pin 217 may be engaged into the pin hole of the dump box mount 216, as shown in FIG. 4. The dump box mount pin 217 may be held in the dump box mount 216 in the pin hole by a lock pin 218. The dump box mount pin 217 may be directly engaged to the dump box 110 for additional support of the support frame 200. As discussed above, various configurations can be utilized to fix the support frame 200 to the dump box 110 within the scope of the disclosure.

The support frame 200 may be longer in length than the length of the dump box 110 so that sand is less likely to spill over. When the dump box 110 is raised, sand will be poured into the support frame 200. To prevent spill over and/or guide the sand within the support frame 200, the opposite wall 230 may be sloped. The height of the support frame 200 may be determined by the amount of sand that can be carried by the dump box 110 and the length of the support frame 200. That is, if the size of the dump box 110 is larger, the height of the support frame 200 may be higher to contain more sand. In contrast, if the length of the support frame 200 is longer, assuming a same size dump box 110, the height of the support frame 200 may be lower.

Figure 5:
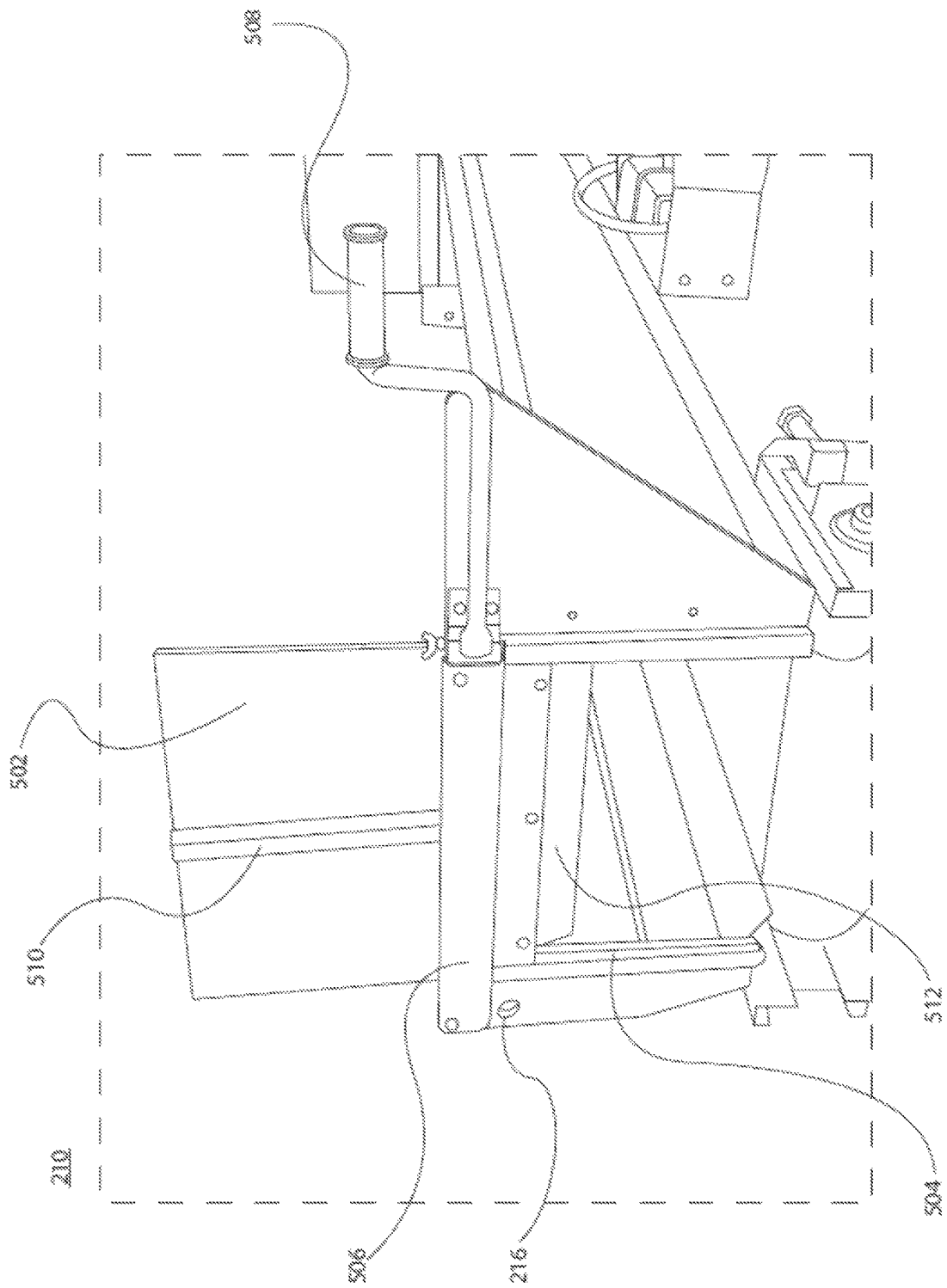
FIG. 5 is a perspective view of a feed gate of a support frame according to an aspect of the disclosure.

Once sand is poured into the support frame 200, the sand in the support frame 200 may be ready to fill sandbags. For this purpose, a feed gate 210 may be provided to control at least in part a filling of the sandbags. The feed gate 210 may be closed completely as shown in FIG. 2 until it is ready to fill sandbags. When it is ready to fill sandbags, the feed gate 210 may be opened as shown in FIG. 5. In addition, the feed gate 210 can be used to control a flow rate of sand by adjusting a vertical position of the feed gate 210. Additional details of the feed gate 210 will be explained with reference to FIG. 5.

Within the feed gate 210, a feed door 506 may be provided. The feed door 506 may be a plate made with suitable material configured to keep sand inside of the support frame 200. The feed door 506 may be made with same material with the support frame 200 or alternatively other appropriate materials. When the feed door 506 is closed, there may be a gap between the feed door 506 and a conveyor belt (discussed below). In this regard, the gap may be configured such that when the feed door 506 is closed, the feed door 506 may not damage the conveyor belt. To further prevent damage, a rubber belt protector 512 may be provided at the bottom of the feed door 506. In this regard, the rubber belt protector 512 may be placed at the bottom of the feed door 506 such that it may also effectively close the gap between the feed door 506 and the conveyor belt.

The feed door 506 can be raised or lowered through movement within a guide rail 504 that is arranged within the support frame 200. On the face of the feed door 506, a gear track 510 may be provided. The gear track 510 may be engaged in a pinion gear (not shown) connected to a crank handle 508. The crank handle 508 may be mounted on the feed gate cover plate 506 such that when the crank handle 508 is rotated in one direction, the engagement of the pinion gear and the gear track 510 will rotate to raise the feed door 506. Likewise, if the crank handle 508 is rotated in the opposite direction, the feed door 506 will be lowered. Additionally, the crank handle 508 may provide a locking mechanism to hold the position of the feed door 506. Other constructions are contemplated for movement and positioning of the feed door 506.

Figure 6:
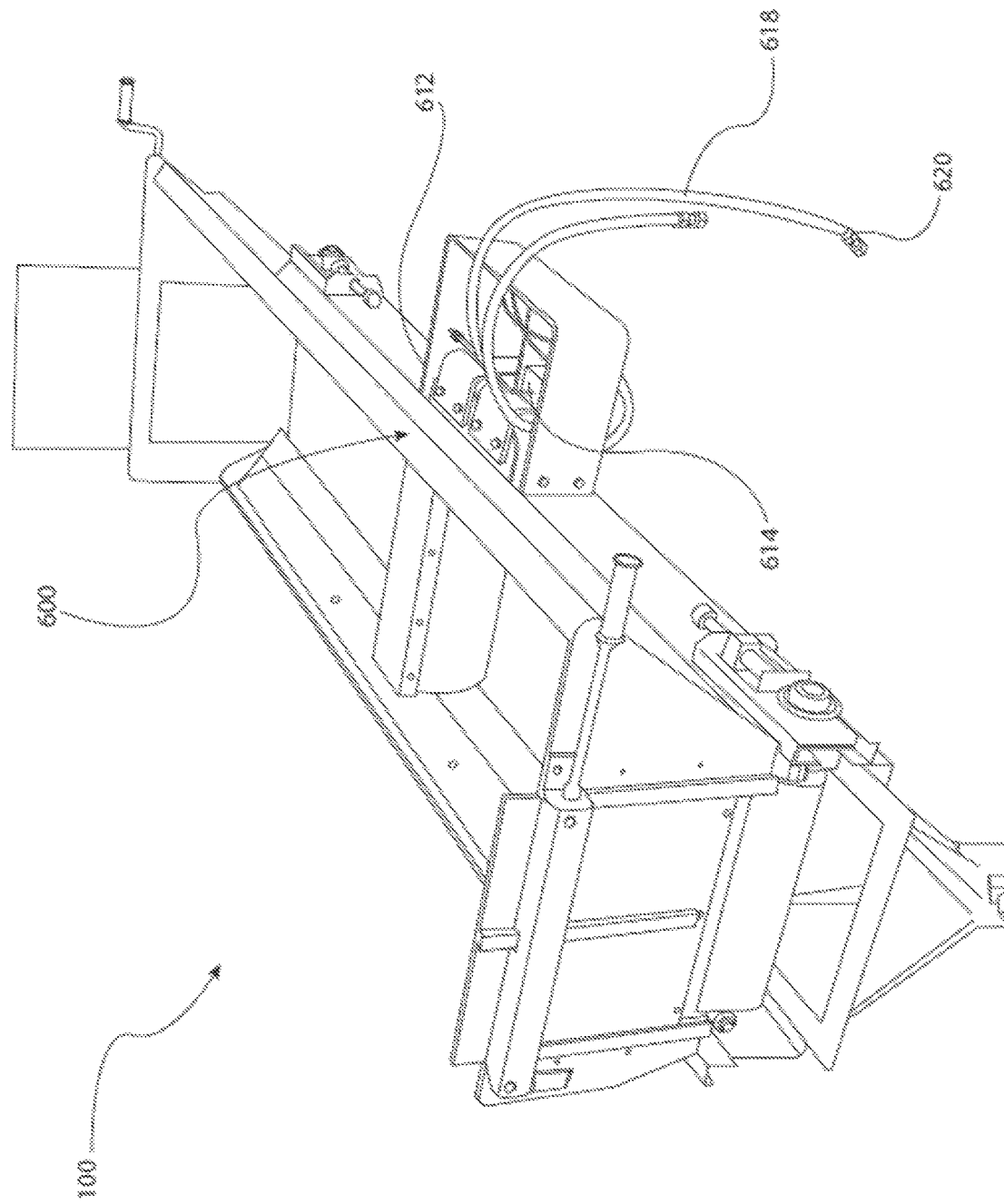
FIG. 6 is a perspective view of a driving unit attached to a support frame of a sandbag filling system according to an aspect of the disclosure.

FIG. 6 is a perspective view of a driving unit attached to a support frame of a sandbag filling system according to an aspect of the disclosure.

Next, a driving unit 600 according to an aspect of this disclosure will be described with reference to FIG. 6. The driving unit 600 may be arranged in the support frame 200. Within the driving unit 600, a motor 614 may be provided with a drive shaft 616 connected directly or indirectly to the motor 614. A sprocket may be attached to the drive shaft 616 on each end.

When the motor 614 is provided with power, the motor 614 will rotate the drive shaft 616. In one aspect, the motor 614 may be implemented as a hydraulic motor and hydraulic power or fluid may be provided from the truck 120. Alternatively, the motor 614 can be an electric motor, and power may be provided from an electrical system of the truck 120. Alternatively, the motor 614 can be implemented utilizing other technologies such as pneumatic motors, gas powered engines, and the like. A driving unit protector 612 may be provided to protect the driving unit 600. The driving unit protector 612 may be made of metal to protect the driving unit 600 in case of a vehicle crash or the like.

Figure 7:
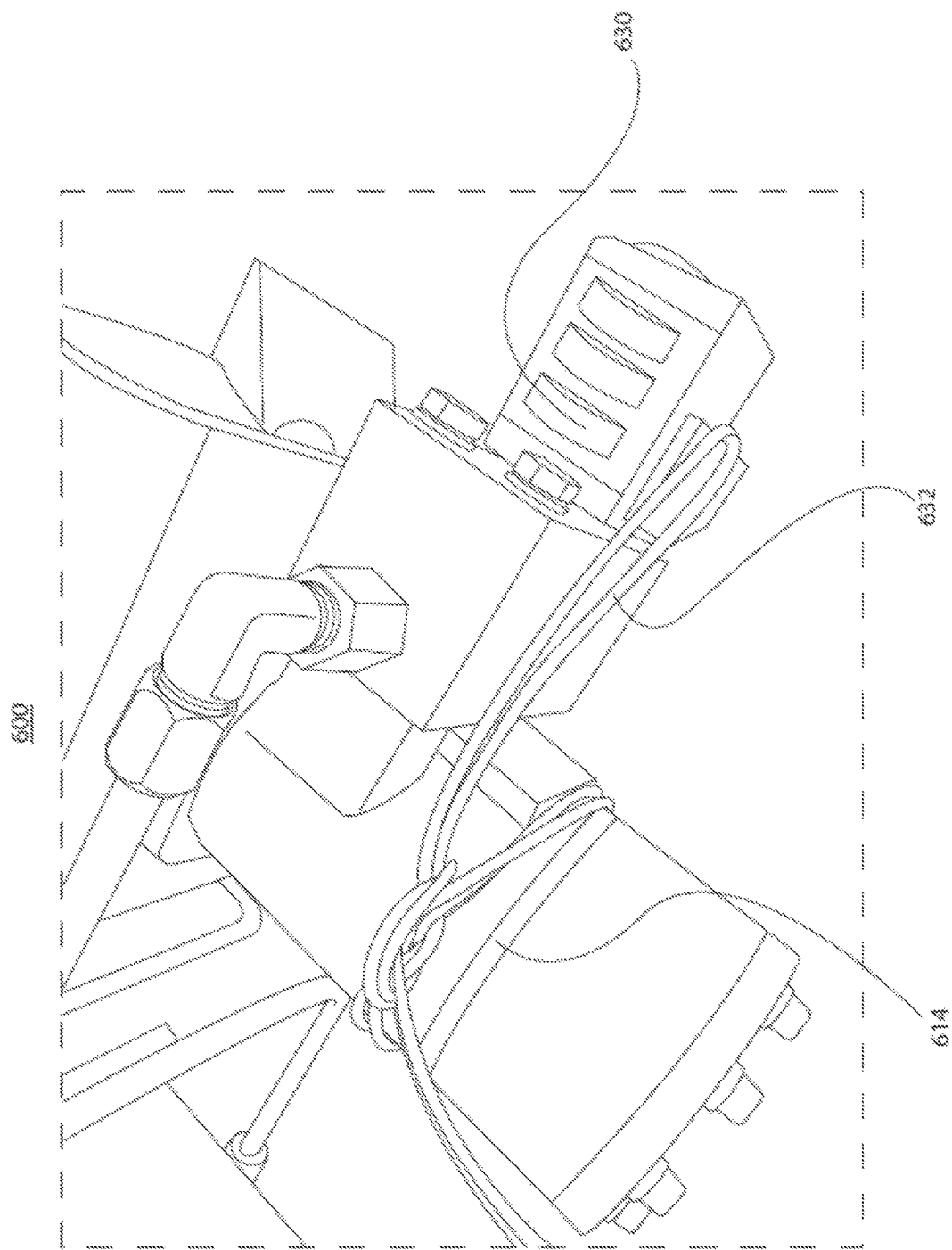
FIG. 7 is a sectional view of a motor for a driving unit according to an aspect of the disclosure.

FIG. 7 is a sectional view of a motor for a driving unit according to an aspect of the disclosure.

Figure 14:
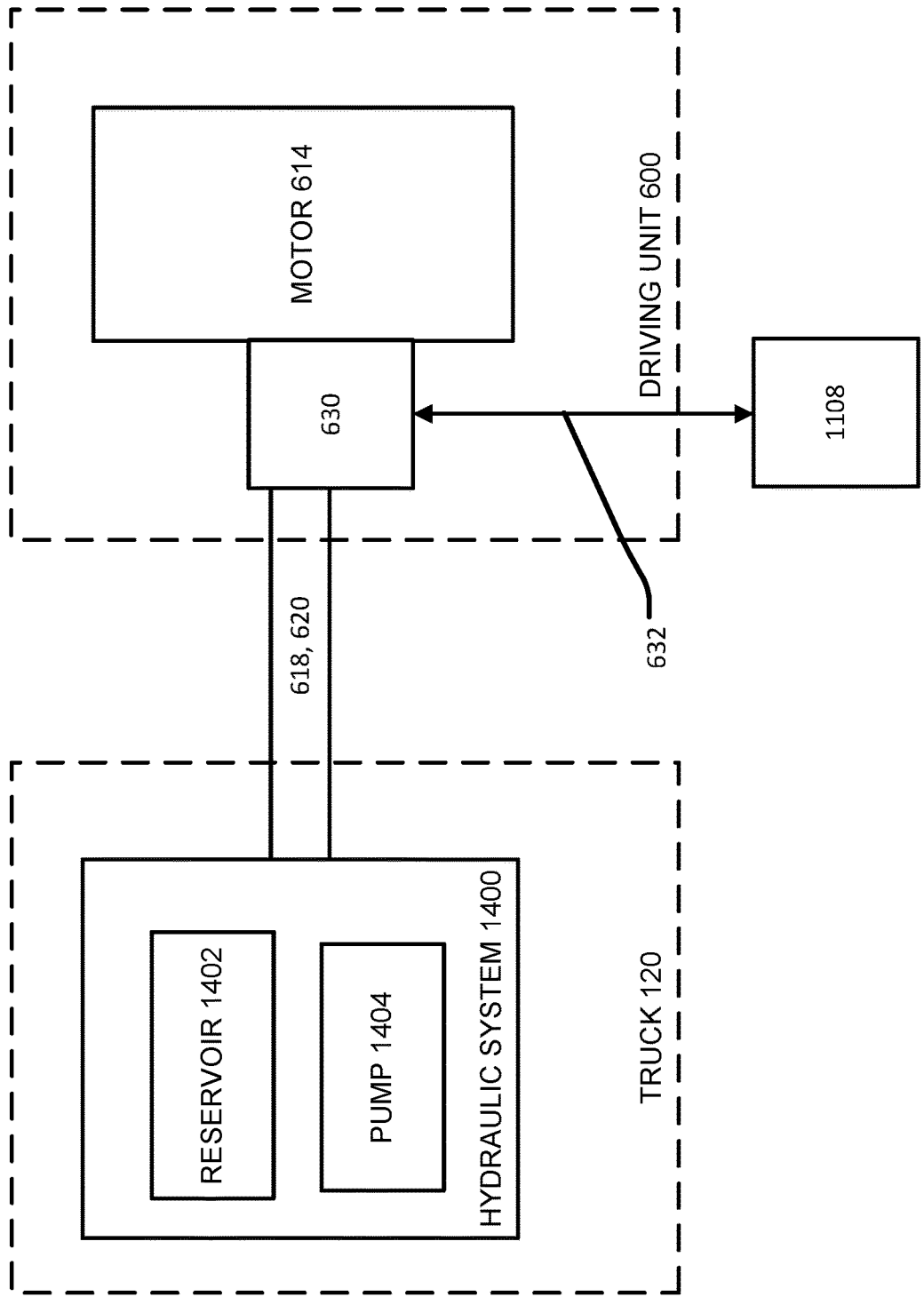
FIG. 14 is a partial schematic view of a sandbag filling system according to an aspect of the disclosure.

If the motor 614 is a hydraulic motor, there may be a hydraulic system 1400 having a hydraulic reservoir 1402, a hydraulic pump 1404, and/or the like (illustrated in FIG. 14) provided by the truck 120 and may be connected through motor hydraulic lines 618. The hydraulic system 1400 may be implemented as a power takeoff (PTO) system. An electric actuator 630 may be also provided to control the hydraulic motor 614 as shown in FIG. 7 and FIG. 14. The electric actuator 630 may be directly connected to the motor 614 as a simple on-off 12-volt switch. The electric actuator 630 may be connected to a power source and the motor 614 via quick sealed connector. The electric actuator 630 may be operated manually, may include other types of operation, and/or it can be operated by another switch, such as an electric switch described below. The electric actuator 630 may be implemented as a solenoid valve to control the delivery of hydraulic fluid to the motor 614.

The motor hydraulic lines 618 may be connected by a motor hydraulic line fitting 620. The direction of the motor 614 rotation can be changed by changing a configuration of the motor hydraulic lines 618. Although an exemplary aspect in FIGS. 6 and 7 shows that the driving unit 600 located generally in the middle of the support frame 200, the driving unit 600 may also located on the end of the support frame 200, other locations on the support frame 200, and/or located separate from the support frame 200 while achieving same function, and thus the location of the driving unit 600 in FIGS. 6 and 7 should not be construed as limiting.

Figure 8:
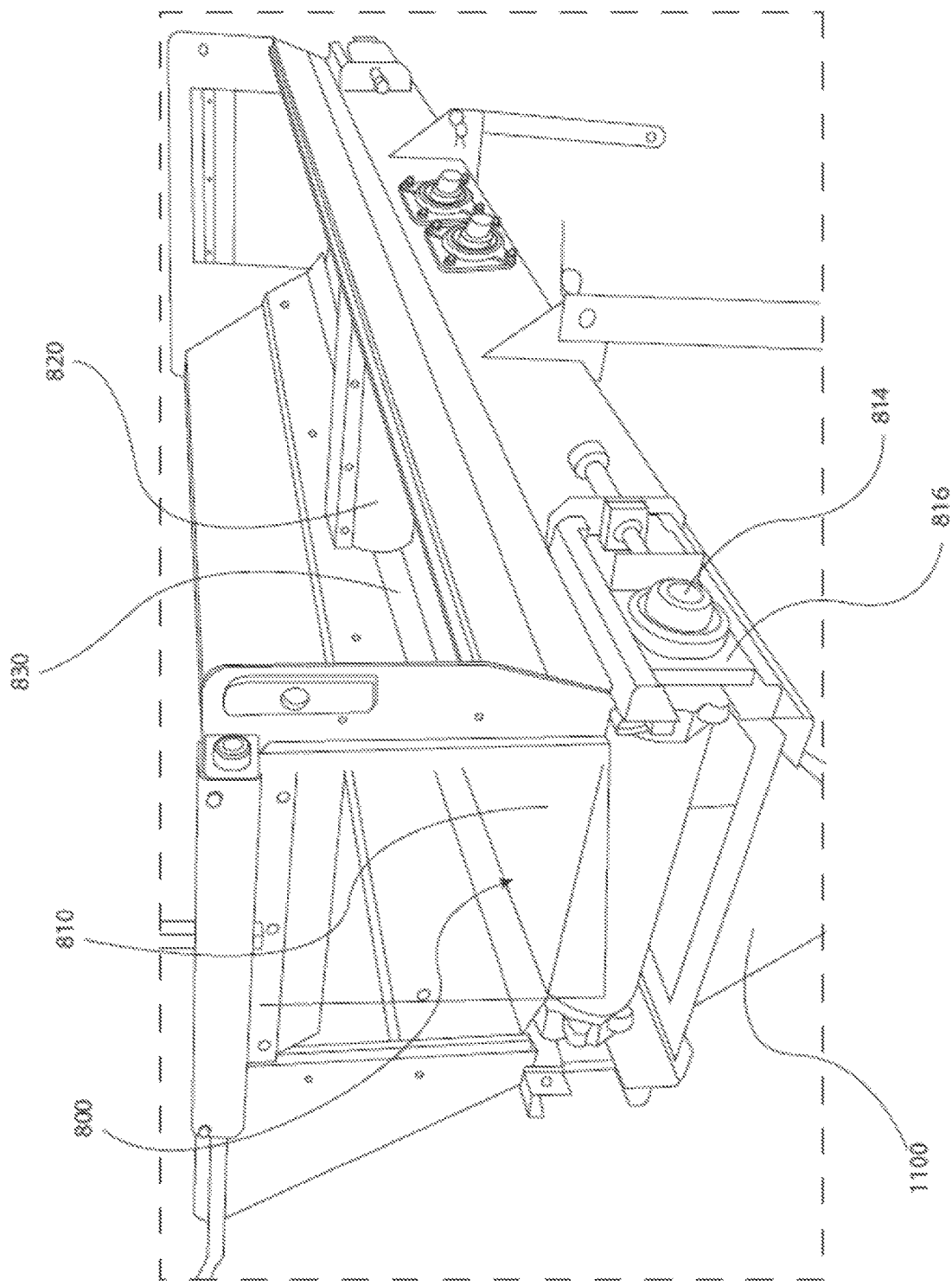
FIG. 8 is a perspective view of a conveyor unit according to an aspect of the disclosure.

FIG. 8 is a perspective view of a conveyor unit according to an aspect of the disclosure.

Figure 9:
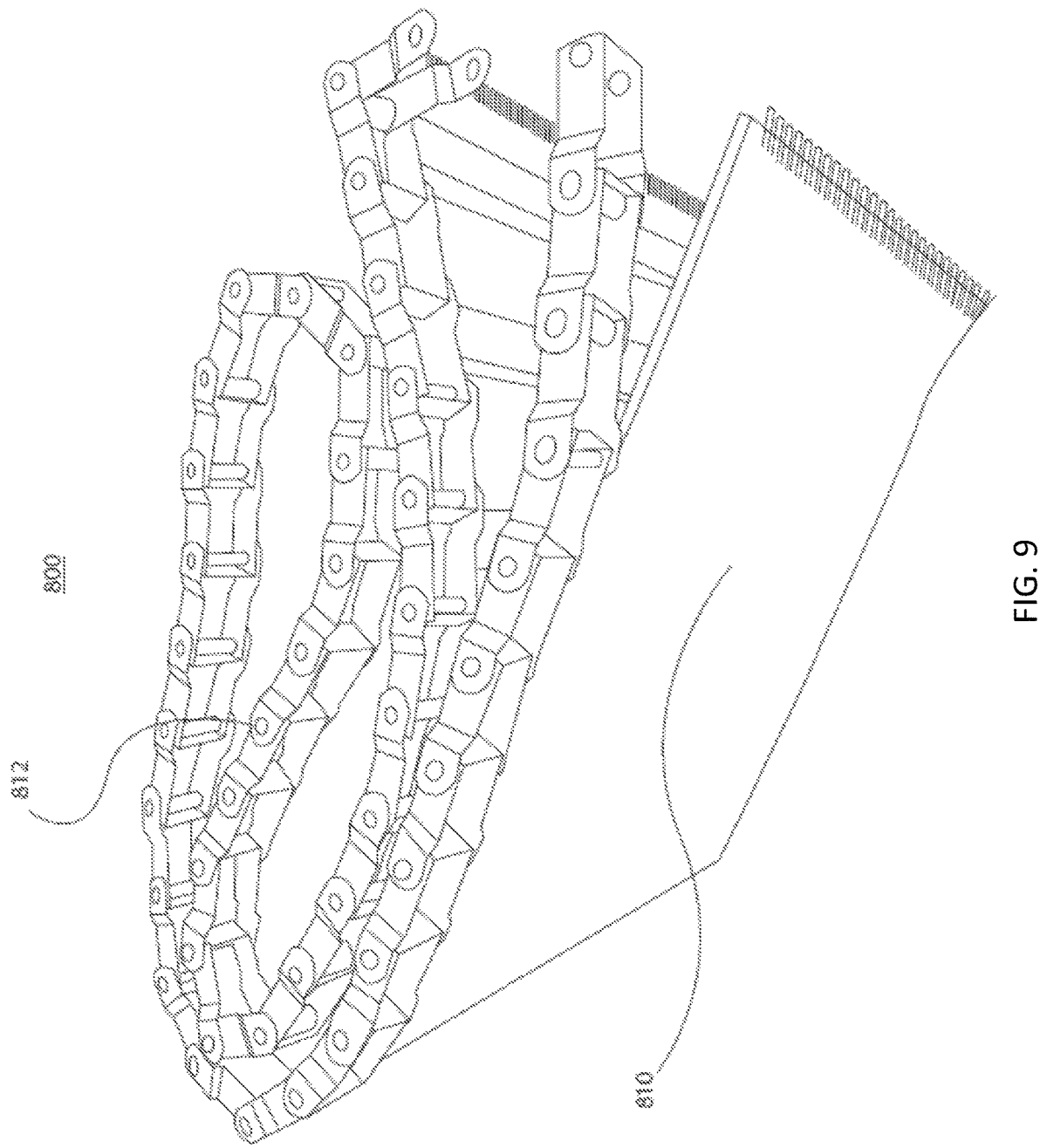
FIG. 9 is a perspective view of a conveyor belt attached to a chain according to an aspect of the disclosure.

FIG. 9 is a perspective view of a conveyor belt attached to a chain according to an aspect of the disclosure.

Figure 10:
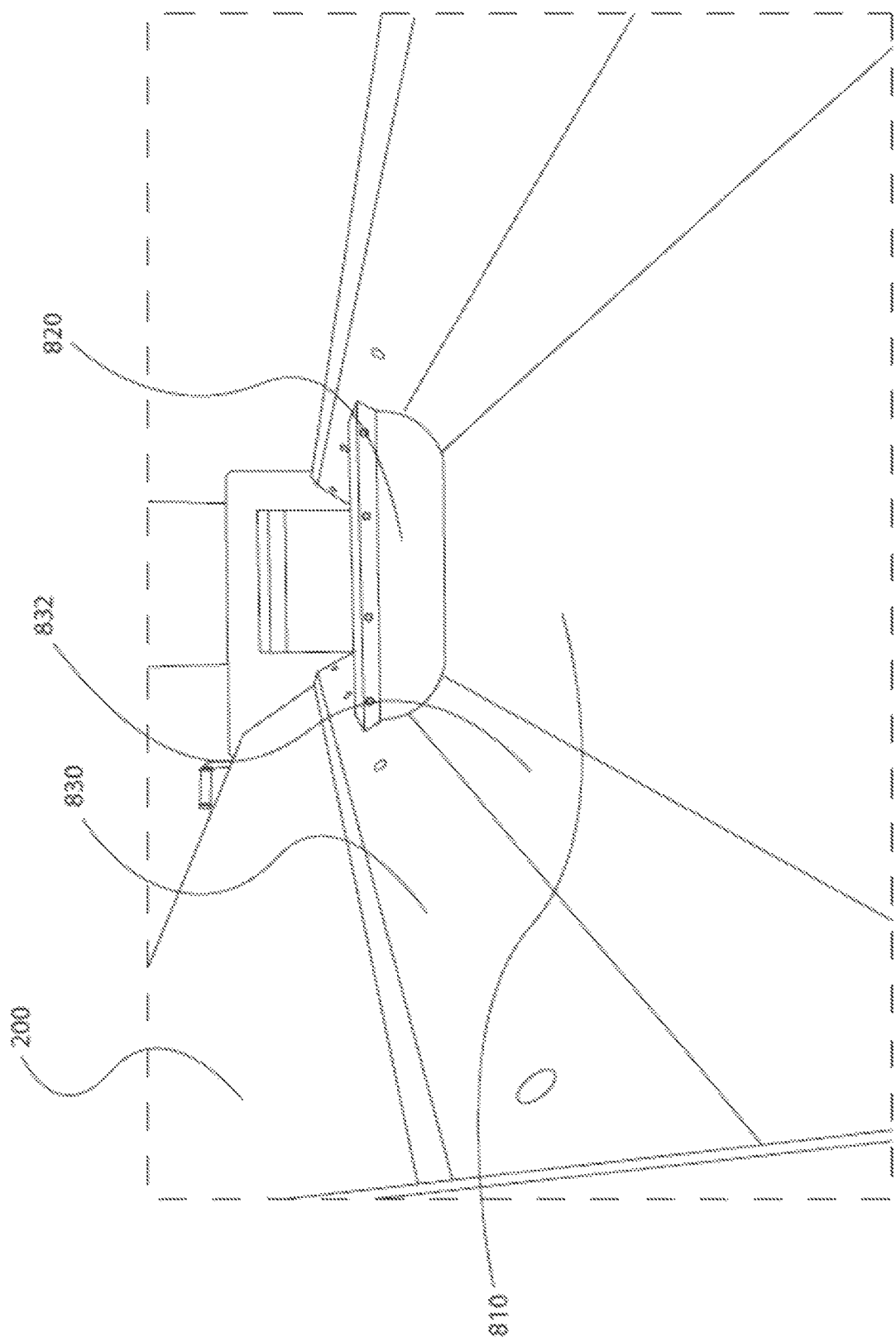
FIG. 10 is an inside perspective view of a conveyor unit according to an aspect of the disclosure.

FIG. 10 is a perspective view of a conveyor unit according to an aspect of the disclosure.

The driving unit 600 moves a conveyor unit 800 to deliver sand. Referring to FIG. 8, a conveyor belt 810 is provided with a chain 812 (as shown in FIG. 9) attached on each side of the conveyor belt 810. In this regard, FIG. 9 illustrates the conveyor belt 810 prior to attachment to the sandbag filling system 100. The conveyor belt 810 may be made of heavy-duty reinforced rubber. Other materials are contemplated as well. The chain 812 may be connected to a drive shaft sprocket that may be attached to the drive shaft 616 on one end, and another end may be connected to a conveyor unit shaft 814 with a conveyor unit sprocket attached. The conveyor belt 810 may be supported horizontally by one or more cross-bar supports between the drive shaft 616 and the conveyor unit shaft 814.

Additionally, a tension of the conveyor belt 810 may be adjusted by moving a conveyor belt tensioner 816. For example, referring to FIG. 8, if the conveyor belt 810 is loose, the conveyor belt tensioner 816 may be moved to the left after loosening tensioner bolts and thereafter the bolts retightened. On the other hand, if the conveyor belt 810 is too tight, the conveyor belt tensioner 816 may be moved to the right. As explained above, the location of the conveyor belt tensioner in FIG. 8 is only exemplary, and it may perform the same function if located elsewhere such as in the middle of the support frame 200. As such, the location of the conveyor belt tensioner 816 should not be construed as limiting.

When the driving unit 600 operates, rotational energy of the drive shaft 616 is transferred to the chain 812 by the drive shaft sprocket. Sand located within the support frame 200 will be delivered along the conveyor belt 810 to the feed gate 210. If there is an additional conveyor unit 800, i.e. dual conveyor, the speed of filling sandbags will generally be faster. In one aspect, the motor 614 may include two motors with each motor configured to drive a respective conveyor belt 810 of the dual conveyor unit 800. In one aspect, a single one of the motor 614 may be configured to drive two of the conveyor belts 810 of the dual conveyor unit 800. In another aspect, two motors 614 can be used to control the two conveyor units 800 separately. In either case, the conveyor units 800 may be operated to deliver sand opposite directions, and two feed gates 210 are provided to accommodate the dual conveyor system.

During operation, sand may get into and damage various moving parts, such as sprockets, chains, and/or the like and it may be beneficial to protect those moving parts to increase durability and/or the reliability of the system. Therefore, a center protector cover 820 and a side protective cover 830 may be provided as shown in FIG. 8 and FIG. 10. For the dual conveyor sandbag filling system, there may be a gap between two drive shafts 616. Accordingly, the center protector cover 820 may be arranged and configured to cover the gap between two drive shafts 616 to protect drive shafts 616 as well as other components. The center protector cover 820 may include material mounted along and axial direction of the conveyor belt 810. The material may include a synthetic material, a rubber material, polymer material, metal material, and/or the like.

Additionally, or independently, the side protective cover 830 may be installed on the support frame 200 to protect chain 812 from sand. The side protective cover 830 may include a material 832 that may be mounted to the support frame 200 to engage a surface of the conveyor belt 810 along a horizontal direction. The material 832 may include a synthetic material, a rubber material, polymer material, metal material, and/or the like. Alternatively, a metal plate may be mounted on the support frame 200 and the material 832 may be mounted on the metal plate. The side protective cover 830 may be installed on each side of the conveyor belt 810. For the dual conveyor sandbag filling system, two side protective covers 830 may be installed to cover the gap between support frame 200 and the conveyor belt 810. Alternatively, four side protective covers 830 may be installed.

Figure 11:
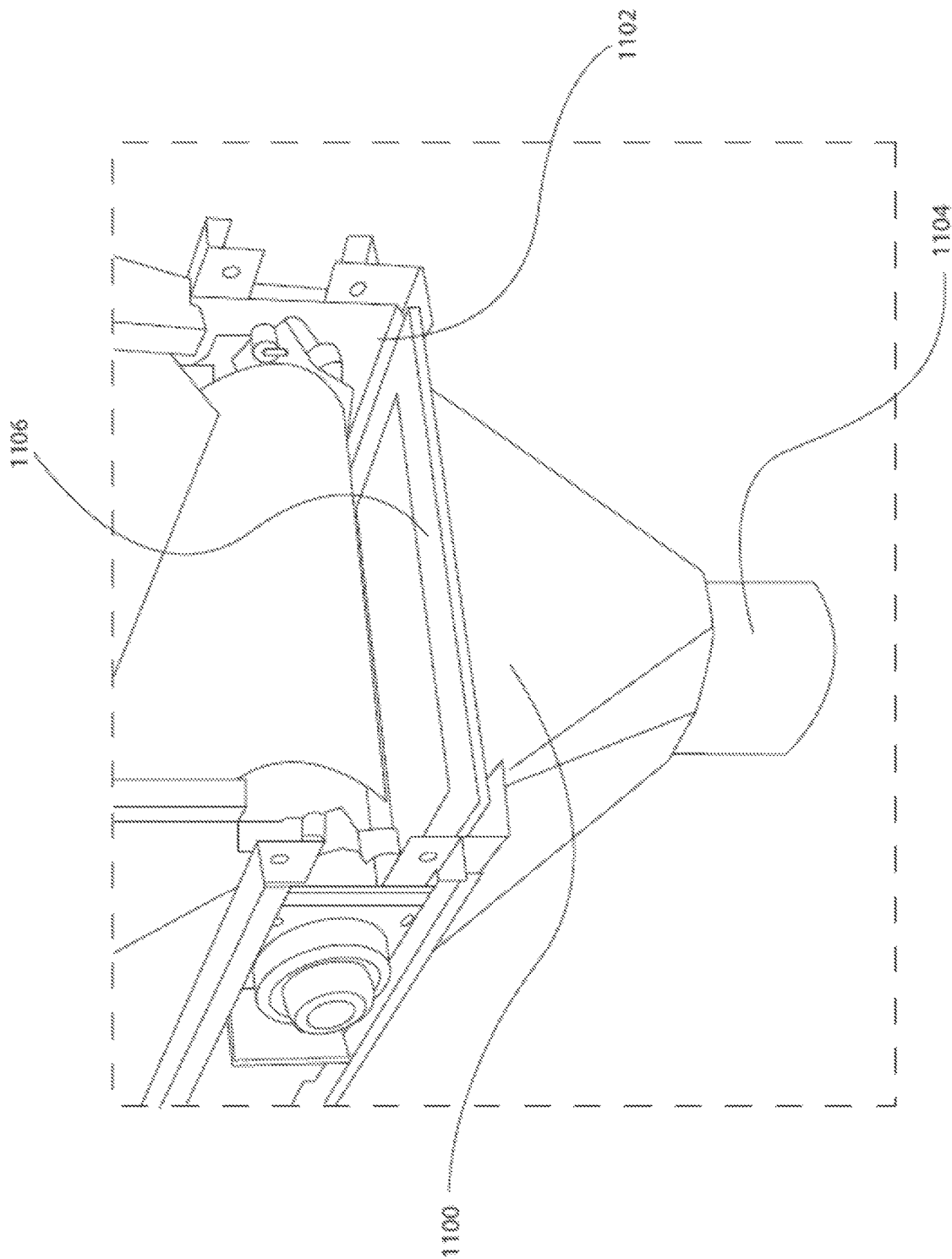
FIG. 11 is a sectional view of a tapered hopper chute according to an aspect of the disclosure.

FIG. 11 is a sectional view of a tapered hopper chute according to an aspect of the disclosure.

Next, a tapered hopper chute 1100 will be described with reference to FIG. 11. The tapered hopper chute 1100 may be configured and installed on a tapered hopper chute mount 1102. The tapered hopper chute mount 1102 may be arranged in the support frame 200 and configured to receive the tapered hopper chute 1100. The tapered hopper chute 1100 may be positioned proximal to the feed gate 210 to receive sand directly coming out from the feed gate 210.

The tapered hopper chute mount 1102 may be configured to fix a position of the tapered hopper chute 1100. The tapered hopper chute mount 1102 may utilize a quick connect and quick disconnect mechanism to change positions thereof as needed for implementation or transportation. The tapered hopper chute mount 1102 may also be configured so that the position of the tapered hopper chute 1100 can be easily adjustable. In this way, if the flow rate of sand is greater or the feed gate 210 is wide open, the tapered hopper chute 1100 may be positioned further away from the feed gate 210. If the flow rate of sand is lower or the feed gate 210 is only slightly open, the tapered hopper chute 1100 may be positioned closer to the feed gate 210. Moreover, the tapered hopper chute 1100 may be positioned inwardly of the sandbag filling system 100 for transportation and may be positioned outwardly during filling of the sandbags.

The tapered hopper chute 1100 may be made of high-density molded plastic, other synthetic materials, a metallic structure, and/or the like. The material may be ultra violet stabilized, smooth in surface texture with uniform wall density. Other constructions are contemplated as well. The tapered hopper chute 1100 may have a chute flange 1106 to mount the tapered hopper chute 1100 onto the tapered hopper chute mount 1102. The tapered hopper chute 1100 may also have a chute portion 1104 that may extend from a lower part of the tapered hopper chute 1100. The chute portion 1104 may be circular in shape so that a sandbag may be inserted onto the chute portion 1104 for filling. The size of the chute portion 1104 may be same or slightly smaller than sandbags to be filled.

Figure 12:
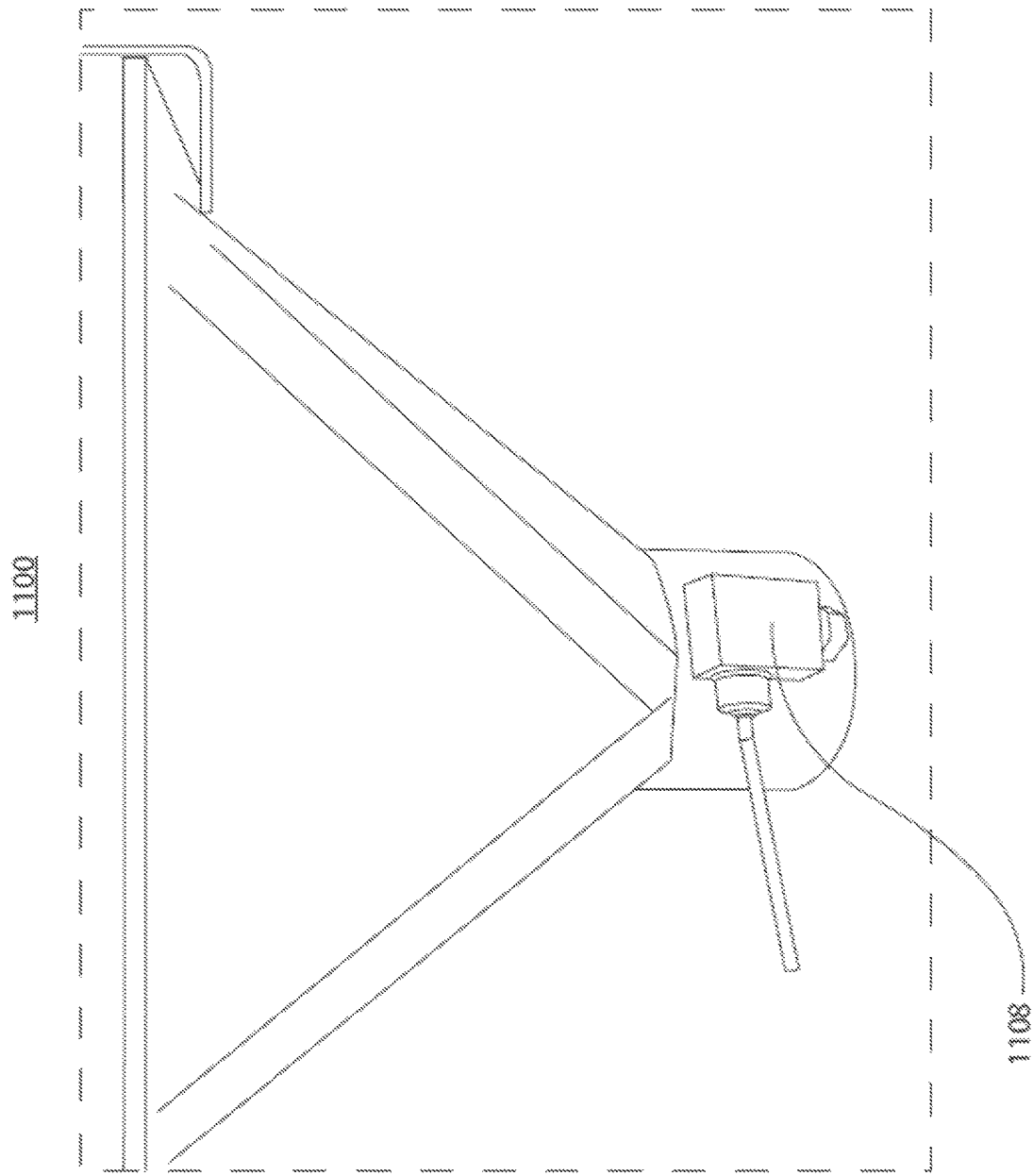
FIG. 12 is a sectional view of a tapered hopper chute with an electric switch according to an aspect of the disclosure.

FIG. 12 is a sectional view of a tapered hopper chute with an electric switch according to an aspect of the disclosure.

The tapered hopper chute 1100 may include an electric switch 1108 attached on the chute portion 1104 as shown in FIG. 12 or otherwise located near the chute portion 1104. In one aspect, the electric switch 1108 may be configured to be operated by an operator's hand holding the sandbag. In one aspect, the electric switch 1108 may be configured to detect a presence of a sandbag or an operator's hand holding the sandbag such that when a sandbag is present proximal to the electric switch 1108. The electric switch 1108 may signal the electric actuator 630 to operate the motor 614. Alternatively, when a sandbag is not present, or an operator's is not present, the electric switch 1108 may signal the electric actuator 630 to not operate the motor 614. That is, when a sandbag is placed below the tapered hopper chute 1100, sand will be delivered to the sandbag through the conveyor unit 800. When the bag is filled and removed from the tapered hopper chute 1100, the motor 614 will stop the conveyor unit 800 so that sand will not be wasted. The electric switch 1108 may be connected to the electric actuator 630 via quick sealed connections or the like.

Figure 13:
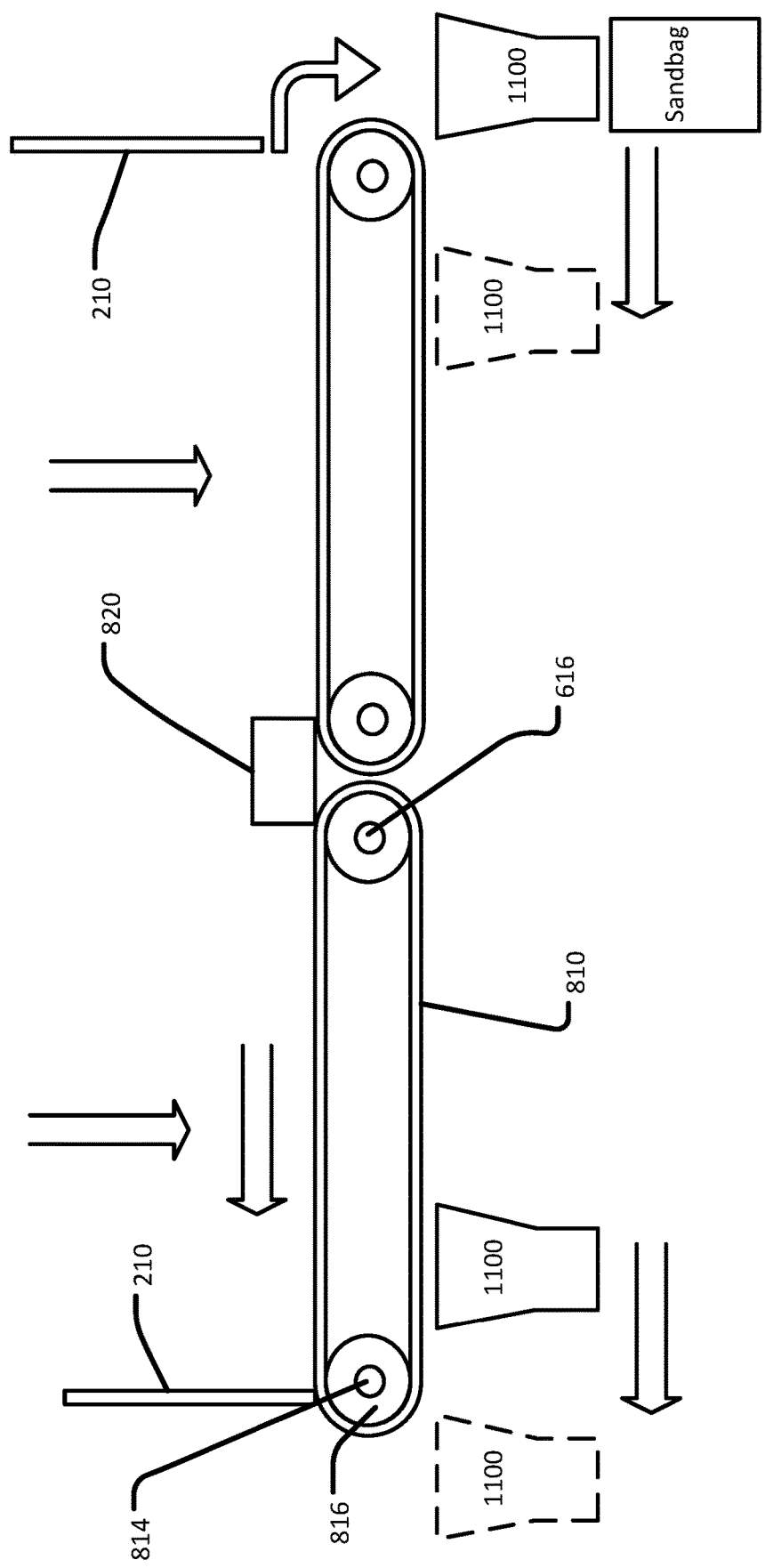
FIG. 13 is a partial schematic side view of a sandbag filling system according to an aspect of the disclosure.

FIG. 13 is a partial schematic side view of a sandbag filling system according to an aspect of the disclosure.

Details of movement of the sand through the sandbag filling system 100 will be explained with reference to FIG. 13. Once the truck reaches a location needing sandbags (a location where imminent flooding may occur), the truck may raise the dump box 110. The sand may be transferred to the sandbag filling system 100. The sand may be prevented from entering between the conveyor belts 810 because the center protector cover 820 may be configured and arranged between the conveyor belts 810. The feed gate 210 may be closed as shown on the left side conveyor unit 800 until the sandbag filling system 100 is ready to fill sandbags.

First, the tapered hopper chute 1100 may be moved or slid such that the tapered hopper chute 1100 may be located proximal to the feed gate 210. In this regard, the tapered hopper chute 1100 may be moved from the position shown on the left side of FIG. 13 to the position shown on the right side of FIG. 13. A sandbag may be placed below the tapered hopper chute 1100. As described above, the electric switch 1108 is arranged near and/or under the tapered hopper chute 1100, the electric switch 1108 may be actuated and may signal the driving unit 600 to start the motor 614. Otherwise, an operator may manually turn the motor 614 switch on. Once the motor 614 is turned on, the motor 614 may rotate the drive shaft 616. The rotational movement of the drive shaft 616 may move the conveyor belt 810 through the drive shaft sprocket. Accordingly, sand in the support frame 200 then may be moved along by movement of the conveyor belt 810.

Next, the feed gate 210 may be opened by rotating the crank handle 508 as shown on the right-side conveyor unit 800. A vertical location of the feed door 506 may be adjusted to control a flow rate of sand to the tapered hopper chute 1100. The location of the feed door 506 may be fixed by the locking mechanism between the crank handle 508 and the feed gate cover plate 506. Thereafter, sand may be moved along the conveyor belt 810 to the feed gate 210. Since the feed door 506 is open, the sand will fall into the tapered hopper chute 1100 by gravity. In this regard, the tapered hopper chute 1100 may be configured and positioned to receive sand from the conveyor belt 810. The tapered hopper chute 1100 may be include a converging funnel shape that is longer than a width of the conveyor belt 810. Other shapes are contemplated as long as the shape of the tapered hopper chute 1100 may be configured to receive the sand from the feed gate 210 to fill the sandbag.

Once the sandbag is filled, the operator may manually turn off the driving unit 600 to stop the conveyor belt 810. If the tapered hopper chute 1100 is equipped with the electric switch 1108 as described herein, removing the sandbag away or the operator's hand from the electric switch 1108 may turn off or otherwise stop the motor 614. Alternatively, when the sandbag is filled, an operator may rotate the crank handle 508 to close the feed door 506. In this way, the conveyor belt 810 may be moving while placing a new sandbag to fill. This may fill the new sandbag quicker than manually turning on and off the motor 614. Once enough sandbags are filled, or sand stored in the dump box 110 is consumed, the dump box 110 of the truck may be lowered. The driving unit 600 may be turned off, either manually or by the electric switch 1108. The feed door 506 may be closed by rotating the crank handle 508 and locking the crank handle 508. The tapered hopper chute 1100 may then be moved back to the position below the support frame 200. Alternatively, the tapered hopper chute 1100 may be removed when the sandbag filling system is not utilized.

FIG. 14 is a partial schematic view of a sandbag filling system according to an aspect of the disclosure.

Details of the hydraulic system 1400 connected to the driving unit 600 will be explained with reference to FIG. 14. If the motor 614 is a hydraulic motor, an additional hydraulic system 1400 may be utilized. The hydraulic system 1400 may be arranged and located on the truck 120. The hydraulic system 1400 may include a hydraulic reservoir 1402, a hydraulic pump 1404, and/or the like. To operate the hydraulic motor 614, pressurized fluid may be supplied to the hydraulic motor 614. Fluid may be stored in the hydraulic reservoir 1402. A size of the hydraulic reservoir 1402 may be determined depending on a size and number of the motor 614 or the particular application. If a higher rate hydraulic motor 614 is used, and/or more than one motor 614 is used, a bigger implementation of the hydraulic reservoir 1402 may be utilized.

The pressurized fluid may be supplied to the motor 614 via the motor hydraulic line 618. The motor hydraulic line 618 may be connected to the hydraulic system 1400 by the motor hydraulic line fitting 620. The motor hydraulic line fitting 620 may be configured to be a quick connect and quick disconnect. The motor hydraulic line fitting 620 may be a screw type fitting. The motor hydraulic line fitting 620 may be spring loaded clip type fitting. Fluid in the hydraulic reservoir 1402 may be supplied to the motor by the hydraulic pump 1404. The hydraulic pump 1404 may be configured to run to supply fluid to the hydraulic motor 614. In some aspects, the hydraulic pump 1404 may be configured to stop when the hydraulic motor 614 does not operate. In some aspects, the hydraulic pump 1404 may be configured to run regardless of an operation of the hydraulic motor 614.

The hydraulic motor may be controlled by the electric actuator 630. The electric actuator 630 may be directly connected to the hydraulic motor 614. The electric actuator 630 may be implemented as a solenoid valve to control the delivery of hydraulic fluid to the motor 614. The electric actuator 630 may be also directly connected to the motor hydraulic line 618 via the motor hydraulic line fitting 620.

The electric actuator 630 may be configured to control the hydraulic motor 614 with or without a direct connection to the hydraulic system 1400.

The electric actuator 630 may be controlled by the electric switch 1108 located at the tapered hopper chute 1100. The electric actuator 630 may be electrically connected to the electric switch 1108 via an electric wiring 632. In this case, if the electric switch 1108 is activated, the electric switch 1108 may signal the electric actuator 630. If the hydraulic pump 1404 is activated to supply fluid to the hydraulic motor 614, activating the electric actuator 630 may provide pressurized fluid into the hydraulic motor 614. If the hydraulic motor 614 is provided with pressurized fluid, the driving unit 600 may operate to move the conveyor unit 800.

Figure 15:
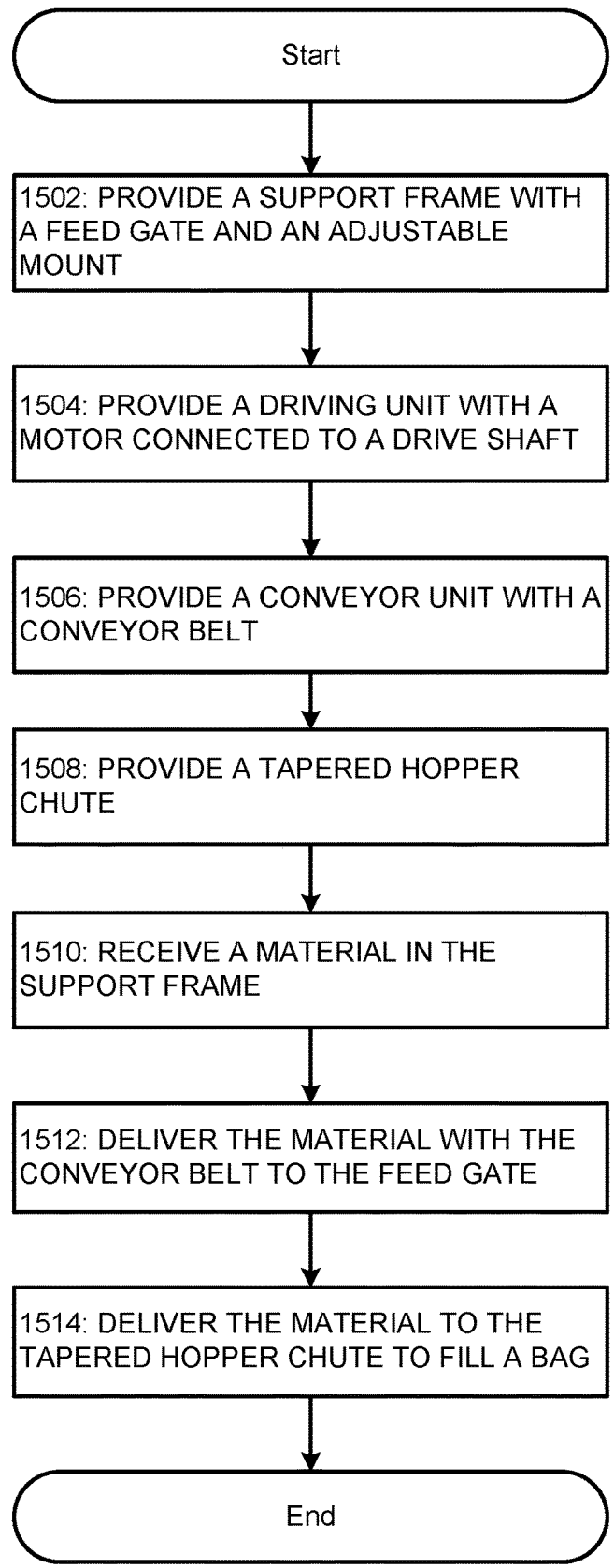
FIG. 15 illustrates a method of filling a sandbag according to an aspect of the disclosure.

FIG. 15 illustrates a method of filling a sandbag according to an aspect of the disclosure.

Now, a method of filling a sandbag will be explained with reference to FIG. 15. First, a support frame may be provided 1502. The support frame may include a feed gate and an adjustable mount that is configured to attach the support frame to a truck. The support frame may be configured to guide a material. Next, a driving unit may be provided 1504. The driving unit is arranged in the support frame and comprises a motor connected to a drive shaft.

Next, a conveyor unit may be provided 1506. The conveyor unit may be arranged in the support frame and may include a conveyor belt with two ends and a conveyor belt as described herein. The conveyor belt may be configured to be moved by the driving unit. The conveyor belt may be controlled by an electric switch mounted adjacent to the tapered hopper chute. The electric switch may detect a presence of the sandbag under the tapered hopper chute, may be configured to be operated by an operator's hand, and/or the like. The electric switch may send a signal to the motor to start. Likewise, the electric switch may be actuated by removing a sandbag under the tapered hopper chute, operated by an operator's hand, and/or the like. The electric switch then may send a signal to the motor to stop.

Next, a tapered hopper chute may be provided 1508. The tapered hopper chute may be arranged below the feed gate of the support frame and located proximal to one end of the conveyor belt.

Then a material may be received in the support frame 1510. The support frame may be configured to guide the material to the conveyor belt. The material may be the delivered with the conveyor belt to a feed gate 1512, and finally delivered to the tapered hopper chute through the feed gate to fill a sandbag with the material 1514. The feed gate may be opened by rotating a crank handle in one direction. The feed gate may be closed by rotating the crank handle in another direction. A sandbag filling speed may be adjusted by adjusting a location of the feed gate.

In one aspect, the sandbag filling system 100 may be mounted on the rear of a minimum 5 cubic yard hydraulically operated dump truck body. Other size trucks and/or vehicles are contemplated as well including a pickup truck, a tractor-trailer, a large tractor, a trailer, a rail car, and/or the like. In one aspect, the sandbag filling system 100 may mounted rapidly utilizing a mounting pin and spring clip system for the mechanical portion, quick disconnect as well as swivel hose assemblies for the hydraulic portion and sealed connectors for the electrical portion. In one aspect, the sandbag filling system 100 may be configured such that two operators may have the capability of filling a minimum of 1,200 sandbags per hour. In one aspect, the sandbag filling system 100 may utilize a hydraulic system with a minimum flow of eight gallons per minute at 1,500 PSI. Other hydraulic systems may be utilized as well.

In one aspect, the support frame 200 may be constructed of steel such as 7-gauge steel. The end plate assemblies may be produced from steel such as ¼" minimum wall steel. All major joints may be continuous welded except where flexural movement may be required. At these areas, skip welding may be employed. In other aspects, the support frame 200 may be constructed from aluminum, magnesium, copper, plastics, carbon fibers, composite wood such as plywood, reinforced plastics, such as fiber-reinforced polymer or fiberglass, metal matrix composites, other advanced composite materials including fiber-reinforced polymers (FRP)s, carbon-fiber-reinforced polymer (CFRP) materials, glass-reinforced plastic (GRP) materials, and the like. The feed gate 210 with flexible seal may be installed at each end of sandbag filling system 100 to control flow of sand. The feed door 502 may be raised and lowered via a lockable rack and pinion gear system. The feed gate cover plate 506 with the crank handle 508 may be included to achieve door adjustment.

In one aspect, the support frame 200 may extend the full width of a dump body of the truck. Standard dump bodies may be generally 96" in width. Flexible wiper belting seals may be utilized with for example ¼" minimum thickness reinforced rubber that may be included on both sides of the conveyor belt 810. Other size trucks and/or vehicles are contemplated as well including a dump truck, a pickup truck, a tractor-trailer, a large tractor, a trailer, a rail car, and/or the like. The wiper seals may deflect the material to the conveyor belt 810 and may be adjustable for wear purpose. A reinforced rubber deflection shield may be affixed to the support frame 200 to disperse material uniformly to the tapered hopper chute 1100 when the dump body is raised to refill the support frame 200.

In one aspect, the conveyor unit 800 may include belting with ⅜"×1¼" cross bar supports. The conveyor belt 810 may include heavy-duty hot asphalt type reinforced rubber. Conveyor belt direction may be reversible by reversal of the motor hydraulic lines 618. The feed gate 210 may be configured for flow variance and may be rack and pinion adjustable for right- and left-hand sides. An opening of the feed gate 210 may be for example 16¼×13". Other sizes are contemplated as well. The drive shaft sprocket and the conveyor unit shaft sprocket may be implemented with six tooth flame cut keyed and timed with 1½" shafts. Other configurations are contemplated as well. In one aspect, the sandbag filling system 100 may utilize eight bearings that may be roller type bearings with greaseable linkage. The chain 812 and sprockets may not require lubrication. In one aspect, the sandbag filling system 100 the belt tension may be adjustable via hexagon threaded adjustment toward right and left side of the support frame 200.

In one aspect, the support frame 200 may be attached by adjusting mounting brackets, mounting pins, spring-loaded key clips, fasteners, and/or the like. The support frame 200 may be attached to the rear of the truck by brackets such as ½" plate mounting brackets, mounting pins with spacer washers, hexagon head cap screws, lock washers, nuts, fasteners, and/or the like.

In one aspect, the tapered hopper chute 1100 may be constructed of high density rotationally molded polyethylene. The material may be ultra violet stabilized, smooth in surface texture with uniform wall density and white in color. The minimum wall thickness may be 5/16" with a minimum yield of 5,000 psi. The chute flange 1106 may be configured to be bolted to the tapered hopper chute mount 1102 by means of stainless-steel hex head cap screws, washers, nuts, fasteners, and/or the like. The tapered hopper chute mount 1102 may be configured so that bolts and/or other fasteners may be easily loosened to slide the tapered hopper chute 1100 in and out for transportation purposes. The electric switch 1108 may be configured to control the hydraulic motors 614 to operate the conveyor belts 810. The electric switch 1108 may be attached to a bottom section of the tapered hopper chute 1100 with a stainless-steel worm gear clamp. The clamp may be adjustable for operator's preference. Other types of connections are contemplated as well.

In one aspect, two hydraulic motors may be mounted on a front side of the support frame. In this aspect, the hydraulic motors may be protected by the driving unit protector. Further in this aspect, the two drive shafts may be mounted in the center of the support frame and may be extended out to the rear of the support frame. In one aspect, the driving unit 600 may include dual manifold valving with dual counter rotational electrically actuated implementations of the hydraulic motor 614 operational individually or simultaneously. Simple on-off twelve-volt sealed switch connections may allow the operation of the motors independently or simultaneously to avoid the need for additional plumbing and electrical circuitry. Each of two hydraulic motors may be configured to be three gallons per minute at 1,500 psi. The hydraulic fluid not used in the system may be returned to the hydraulic reservoir 1402.

In one aspect, the electrical wiring may be continuous. In one aspect, the sandbag filling system 100 may use pinned, lockable, sealable quick connectors or the like for rapid change-out and leak proof corrosion free connections. All circuitry may be implemented with an electrical system operating at, for example, twelve volts.

In one aspect, all steel surfaces may be cleaned and prepped to remove rust and welding debris. All steel surfaces may be primed and painted with acrylic enamel having one or more colors.

In one aspect, the support frame 200 may be fabricated of 7-gauge steel having for example 97½" long by 32" wide by 16" high dimensions. The feed gate 210 may be fabricated of 7-gauge steel with for example 16" wide by 14" tall dimensions. The feed gate may include a feed door 506, a guide rail 504 for the feed door 506, a feed gate cover plate 506, a crank handle 508 for the feed door 506, a gear track 510 to hold the feed door 506 at desired opening, and a rubber belt protector 512. In one aspect, the adjustable mount 220 may be fabricated of steel, such as 5/16" steel with a hole, such as a 1" hole, and may be configured to be mounted to the truck. In one aspect, the adjustable mount 220 may be a bottom truck frame quick mount bracket. A pin, such as 1"×1¼" pin, may be provided with a lock pin to hold the pin in place. A hole, such as 1" hole, may be provided on the support frame 200 and may be configured to attach to a dump body push plate with a pin, such as 1"×2¼" pin, with a lock pin to hold in place.

In one aspect, a hydraulic motor 614 may be mounted on the front side of the support frame 200. The hydraulic motor 614 may be protected by the driving unit protector 612. A drive shaft 616 may be mounted in the center of the support frame 200 and may be extended out to the rear of the support frame 200. The drive shaft 616 may be connected to the hydraulic motor 614 and configured to be protected by the center protector cover 820.

In one aspect, the conveyor belt 810 may be joined with the chain 812, and the chain 812 may be a D667X type chain. The conveyor belt 810 may be approximately 48½" long riveted with ⅜"×1¼ crossbars. Other sizes are contemplated as well. The conveyor belt 810 may be H.D. hot asphalt type. The conveyor unit 800 may include four of the conveyor belt tensioners 816. The conveyor belt tensioners 816 may be placed on each corner of the support frame 200. The conveyor belt tensioners 816 may include a rod, such as a 1" threaded rod, mounted in a steel housing to control the tension of the conveyor belt 810.

In one aspect, a center protector cover 820 may be arranged in the center of the conveyor unit 800 to protect the shafts and sprockets from sand. A side protective cover 830 may include a steel plate mounted over a rubber structure, such as 3/16" rubber structure to protect the conveyor chain 812 links from sand. The side protective cover 830 may be approximately 6" tall constructed of 10-gauge steel and hold the rubber in place. The side protective cover 830 may be adjustable.

In one aspect, the tapered hopper chute 1100 may be constructed of high density rotationally molded polyethylene. The chute flange 1106 may be configured to be bolted to the tapered hopper chute mount 1102. The electric switch 1108 may be mounted to the bottom section of the tapered hopper chute 1100 with a stainless-steel worm gear clamp. The electric switch 1108 may be a micro switch.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A sandbag filling system comprising:
a support frame comprising at least one feed gate and at least one mount configured to be attached to at least one of the following during operation: a truck, a dump truck, a vehicle, a pickup truck, a tractor-trailer, a large tractor, a trailer, and a rail car;
a driving unit arranged on the support frame that includes at least one motor connected to at least one drive shaft;
a conveyor unit arranged in the support frame including at least one conveyor belt having a first end and a second end, the at least one conveyor belt being configured to be moved by the driving unit;
at least one hopper chute arranged below the at least one feed gate of the support frame and located proximal to the second end of the conveyor belt;
a second driving unit arranged in the support frame comprising a second motor connected to a second driving unit shaft;
a second conveyor unit arranged in the support frame including a second conveyor belt having a first end and a second end, a conveyor unit shaft with a sprocket attached, and a chain mounted to the conveyor belt and linked to the sprocket of the second driving unit shaft and the sprocket of the conveyor unit shaft;
a second hopper chute attached below a second feed gate of the support frame and located proximal to the second end of the second conveyor belt;
a center protector cover arranged and located between two conveyor units and configured to protect the shafts and the sprockets from sand; and at least one side protective cover located between the support frame and the conveyor belt and configured to protect the chains from sand, wherein the support frame is configured to receive a material and guide the material to the at least one conveyor belt;

wherein the at least one conveyor belt is configured to deliver the material to the at least one feed gate; and wherein the at least one feed gate is configured to deliver the material to the at least one hopper chute to fill a sandbag with the material.

2. The sandbag filling system of claim 1 further comprising:
a first sprocket attached to the at least one drive shaft; and
the conveyor unit further comprising a conveyor unit shaft, a second sprocket attached to the conveyor unit shaft, and a chain mounted to the conveyor belt linked to the first sprocket and the second sprocket.

3. The sandbag filling system of claim 1 further comprising:
a second driving unit arranged in the support frame comprising a second motor connected to a second driving unit shaft;
a second conveyor unit arranged in the support frame including a second conveyor belt having a first end and a second end, a conveyor unit shaft with a sprocket attached, and a chain mounted to the conveyor belt and linked to the sprocket of the second driving unit shaft and the sprocket of the conveyor unit shaft; and
a second hopper chute attached below a second feed gate of the support frame and located proximal to the second end of the second conveyor belt.

4. The sandbag filling system of claim 1, wherein the support frame is longer in length than a width of a cargo area of the vehicle.

5. The sandbag filling system of claim 3, wherein the motors are configured as hydraulic motors.

6. The sandbag filling system of claim 5 further comprising:
at least one fluid connection connected to the motors and configured to connect to a hydraulic system; and
an electric actuator configured to control the hydraulic motors.

7. The sandbag filling system of claim 6 further comprising:
an electric switch mounted adjacent to the hopper chutes, wherein the electric switch is configured with an electrical connection to the electric actuator and configured to control the electric actuator to control the hydraulic motors.

8. The sandbag filling system of claim 1, wherein the feed gate further comprises a feed door, and a guide rail attached to the support frame to guide the feed door.

9. The sandbag filling system of claim 1, wherein the mount is configured to receive a fastener that engages and fastens the mount to the vehicle.

10. The sandbag filling system of claim 8, wherein the feed gate further comprises a gear track and a handle with a pinion gear to open or close the feed door.

11. The sandbag filling system of claim 9, wherein the mount has a quick connect and disconnect mechanism.

12. The sandbag filling system of claim 1 further comprising a tensioner mounted to a conveyor unit shaft and configured to adjust a horizontal location of the conveyor unit shaft to adjust a tension of the conveyor belt.

13. The sandbag filling system of claim 1, wherein the hopper chute comprises a quick connect and disconnect mechanism.

14. The sandbag filling system of claim 1 further comprising a dump box mount configured to receive a fastener that engages and fastens the dump box mount to the vehicle.

15. A method of filling a sandbag, comprising:
providing a support frame comprising at least one feed gate and at least one mount configured to attach the support frame to at least one of the following: a truck, a dump truck, a vehicle, a pickup truck, a tractor-trailer, a large tractor, a trailer, and a rail car;
providing a driving unit arranged on the support frame that includes at least one motor connected to at least one drive shaft;
providing a conveyor unit arranged in the support frame including at least one conveyor belt having a first end and a second end, the at least one conveyor belt being configured to be moved by the driving unit;
providing at least one hopper chute arranged below the at least one feed gate of the support frame and located proximal to the second end of the conveyor belt,
receiving a material in the support frame which is configured to guide the material to the at least one conveyor belt;
delivering the material with the at least one conveyor belt to the at least one feed gate;
delivering the material to the at least one hopper chute through the at least one feed gate to fill a sandbag with the material; and
controlling the at least one conveyor belt in response to operation of an electric switch mounted adjacent to the hopper chute,
wherein placing the sandbag under the hopper chute operates to start the at least one motor and removing the sandbag operates to stop the at least one motor.

16. The method of filling a sandbag of claim 15, further comprising controlling the at least one conveyor belt in response to operation of an electric switch mounted adjacent to the hopper chute.

17. The method of filling a sandbag of claim 15, further comprising opening a feed door by rotating a crank handle in a first direction to control a flow of sand to the hopper chute.

18. The method of filling a sandbag of claim 15, further comprising adjusting a sand filling speed by adjusting a location of a feed door.

* * * * *